United States Patent
Leister et al.

(10) Patent No.: US 7,296,441 B2
(45) Date of Patent: Nov. 20, 2007

(54) DEVICE AND METHOD FOR MELTING A SUBSTANCE WITH THE OCCURRENCE OF A LOW LEVEL OF CONTAMINATION

(75) Inventors: Michael Leister, Budenheim (DE); Ernst-Walter Schäfer, Welgesheim (DE); Leopold Eichberg, Mainz (DE); Volker Ohmstede, Mainz (DE)

(73) Assignee: Schott AG, Mainz (DE)

( * ) Notice: Subject to any disclaimer, the term of this patent is extended or adjusted under 35 U.S.C. 154(b) by 353 days.

(21) Appl. No.: 10/490,803

(22) PCT Filed: Sep. 12, 2002

(86) PCT No.: PCT/EP02/10242

§ 371 (c)(1),
(2), (4) Date: Aug. 26, 2004

(87) PCT Pub. No.: WO03/031353

PCT Pub. Date: Apr. 17, 2003

(65) Prior Publication Data

US 2005/0005646 A1    Jan. 13, 2005

(30) Foreign Application Priority Data

Oct. 2, 2001 (DE) .................. 101 48 754
Oct. 2, 2001 (DE) .................. 101 49 309
Jan. 18, 2002 (DE) .................. 102 02 024

(51) Int. Cl.
C03B 5/18 (2006.01)
C03B 5/185 (2006.01)
C03B 5/187 (2006.01)
C03B 5/193 (2006.01)

(52) U.S. Cl. .............. 65/135.2; 65/134.1; 65/134.3; 65/134.5; 65/135.6; 65/347; 65/355; 65/DIG. 4

(58) Field of Classification Search ........... 65/134.1, 65/134.3, 134.4, 134.5, 134.9, 135.2, 135.3, 65/135.6, 135.9, 29.18, 326, 335, 346, 347, 65/355, 356, DIG. 4, 134.7; 373/146, 156, 373/163, 27–35; 219/672–677

See application file for complete search history.

(56) References Cited

U.S. PATENT DOCUMENTS 2,020,403 A    11/1935 Engle (Continued)

FOREIGN PATENT DOCUMENTS

DE    199 39 779    8/1999

(Continued)

OTHER PUBLICATIONS

English Translation of the International Preliminary Examination Report, dated Jan. 13, 2004.

(Continued)

Primary Examiner—Eric Hug
(74) Attorney, Agent, or Firm—Ohlandt, Greeley, Ruggiero & Perle, L.L.P.

(57) ABSTRACT

The invention relates to an apparatus and a method for low-contamination melting of high-purity, aggressive and/or high-melting glass or glass-ceramic. According to the invention, for this purpose a melt is heated in a crucible or melting skull crucible by means of high-frequency radiation and is mixed or homogenized in the melting crucible. It is preferable for a gas nozzle, from which gas bubbles, e.g. oxygen bubbles (known as $O_2$ bubbling), escape into the melt, to be provided at the base of the crucible. This alone makes it possible to achieve surprising multiple benefits in the melting skull crucible. Firstly, unmelted batch which drops into the melt in solid form, for example from above, is melted down more quickly as a result of more intensive mixing with the liquid fraction of the melt, secondly the temperature distribution in the melt is made more even, thirdly a uniform distribution or mixing of different glass constituents is achieved, and fourthly the redox state of the glass can be adjusted.

24 Claims, 6 Drawing Sheets

U.S. PATENT DOCUMENTS

| | | | |
|---|---|---|---|
| 3,244,494 A | | 4/1966 | Apple et al. |
| 5,643,350 A | * | 7/1997 | Mason et al. .................. 65/158 |
| 5,709,723 A | * | 1/1998 | Gearing ..................... 65/29.11 |
| 5,738,811 A | * | 4/1998 | Gagel et al. .................. 264/82 |
| 6,588,234 B1 | * | 7/2003 | Kiefer et al. ............... 65/134.3 |
| 6,810,689 B2 | * | 11/2004 | Romer et al. ............... 65/134.1 |
| 7,137,277 B1 | * | 11/2006 | Romer et al. ............... 65/134.3 |

FOREIGN PATENT DOCUMENTS

| | | | |
|---|---|---|---|
| DE | 199 39 780 | | 8/1999 |
| DE | 199 39 785 | | 8/1999 |
| EP | 0 079 266 | | 10/1982 |
| JP | 07 020 289 | | 6/1993 |
| WO | WO 98/05185 | | 7/1996 |
| WO | WO 00/32525 | | 12/1998 |
| WO | WO 01/14266 | * | 3/2001 |

OTHER PUBLICATIONS

Article "Continuous Casting Glass Melting in a Cold Crucible Induction Furnace" by Petrov et al., pp. 72-77, 1989.

* cited by examiner

DEVICE AND METHOD FOR MELTING A SUBSTANCE WITH THE OCCURRENCE OF A LOW LEVEL OF CONTAMINATION

BACKGROUND OF THE INVENTION

1. Field of the Invention

The invention relates to an apparatus and a method for the low-contamination melting of a substance in general and in particular for the melting of high-purity, aggressive and/or high-melting glass or glass-ceramic, specifically.

2. Description of Related Art

In traditional melting methods, glass is melted continuously in a platinum crucible or in refractory tank furnaces. A drawback of such methods is that some of the platinum is released to the melt, and the refractory tank furnaces have only short service lives. The desired high-purity glass quality cannot be achieved in this case.

There are also known methods in which glass is melted continuously in melting tank furnaces and removed. To obtain high-quality glass, a refining channel and a homogenization device or tank furnace may follow the melting tank furnace.

In both the above mentioned methods, discontinuous or continuous, the melting crucible or the melting tank furnace are externally heated, e.g. by a burner, and the heat is conductively transmitted to the melt in the interior. There is direct contact between the melt and the crucible or tank furnace. This has a number of drawbacks.

Firstly, the maximum melt temperature is limited by the crucible or tank furnace material. Therefore, the melting crucible or melting tank furnace and if appropriate the refining channel and the homogenization tank furnace usually consist of platinum, which has a relatively high melting point and is relatively resistant to corrosion.

Furthermore, the platinum melting crucible or the platinum melting tank furnace, and also the refining channel and the homogenization tank furnace, is attacked and corroded by the glass melt.

In any case, platinum disadvantageously leads to contaminations or impurities in the glass, which have an adverse effect on the optical properties, in particular the transmission, and consequently these conductive-heating methods can only be used to a very restricted extent for high-purity glasses. Impurities of this nature lead to transmission losses in optical fiber transmission systems of up to 200 to 500 dB/km.

This has proven extremely problematical in particular for the melting of aggressive glasses, e.g. zinc silicate or lanthanum borate glasses, since these glasses cause extensive corrosion to the crucibles or tank furnaces.

In addition to the conductive-heating methods mentioned above, it is also known to use methods in which glass is melted and heated inductively in a skull crucible.

A skull crucible typically comprises meandering water-cooled metal tubes which are spaced apart from one another. The melt inside the interior of the skull crucible is heated by a coil arrangement arranged around the skull crucible by high-frequency power being introduced into the melt.

Cooling of the skull crucible results in the formation of a substantially solid layer or crust of material of the same composition, i.e. in particular of glass, between the skull crucible and the melt. To this extent, impurities in the melt caused by the crucible material are significantly reduced.

A skull crucible is known, for example, from PETROV YU. B. et al., "Continuous Casting Glass Melting in a Cold Crucible Induction Furnace", XV. International Congress on Glass 1989, Proceedings, Vol. 3a, 1989, pages 72 to 77.

However, the complex structure, in particular the high-frequency technology requirements of an inductively heated skull melting device, results in completely new requirements and problems compared to the abovementioned conductive-heating melting apparatuses. Firstly, the high melting temperature and very high throughput rates per crucible volume means that many solution approaches for conductive-heating apparatuses cannot readily be transferred to skull melting apparatuses.

In principle, high melting rates and therefore high throughputs can be achieved with a skull melting apparatus. Although this is desirable, on the other hand this may under certain circumstances cause the quality of the melt and therefore of the end product to suffer, for example as a result of thermal reduction. This also leads to a deterioration in the transmission properties of the glass.

Furthermore, the rate at which the high-frequency radiation is introduced depends on various parameters of the melt. Therefore, the melting performance is restricted not only by the high-frequency power emitted by the coil arrangement but also by the melting parameters and crucible geometries.

Consequently, the known skull melting apparatuses are in need of improvement in particular with regard to the quality and homogeneity of the melt and also with regard to the melting capacity or throughput.

Document DE 199 39 780 A1 has disclosed an induction-heated skull crucible in which the metal tubes of the crucible wall are short-circuited with one another above the base, in order to displace the HF field upward or downward.

Document DE 199 39 779 A1 describes an apparatus for the continuous melting and refining of glasses and glass-ceramics, which comprises a melting vessel, a refining vessel and an agitation crucible. The agitation crucible is located at the end of a channel which is connected to the refining vessel.

Document DE 199 39 785 A1 has disclosed a method and an apparatus for producing colored glasses in which, during the further processing, the melt is fed through a skull device. This skull device is located downstream of a melting station.

Document WO 98/05185 A1 shows an induction furnace for glass melting, having a cooled tongue and an induction device beneath the tongue.

U.S. Pat. No. 3,244,494 has disclosed a method for introducing and melting in a glass furnace which is induction-heated. The result is a convective flow, but the flow rate of this convective flow is slow enough to ensure that raw material cannot or can scarcely descend into the melted glass.

The abovementioned apparatuses and methods can be improved further in terms of the melting capacity and glass quality.

WO 00/32525 has disclosed a method and an apparatus for vitrifying organic waste, in particular radioactive waste, in which the supply of oxygen used to oxidize the organic substances is effected both from the surface and from the underside of a melting crucible. Oxygen is supplied substantially in such a way that it has a locally limited influence. As a result, however, the redox state of the melt is only locally changed and the melt as a whole is not homogenized.

SUMMARY OF THE INVENTION

Therefore, it is an object of the present invention to provide an apparatus and a method, in particular a skull melting apparatus or a skull melting method, for melting a substance, in particular glass or glass-ceramic, which allow an improved homogeneity, an increased melting capacity, an increased throughput and/or a high substance or glass quality to be achieved.

A further object of the present invention is to further develop known skull melting apparatuses or skull melting methods and to avoid or at least alleviate the drawbacks of known apparatuses and methods.

The object of the invention is achieved in a surprisingly simple way by the subject matter of the claims.

The apparatus according to the invention, in particular a skull melting apparatus for melting or fusing a substance or compound, in particular for melting high-purity, aggressive and/or high-melting glass or glass-ceramic, comprises a, preferably coolable, e.g. water-cooled crucible or skull crucible and an emitting device for emitting electromagnetic radiation, in particular a coil arrangement arranged around the crucible. The emitting device or coil arrangement emits in particular high-frequency electromagnetic radiation which is introduced into a melt inside the crucible, so that the melt is heated by means of the absorbed high-frequency power. Furthermore, there is a mixing or homogenization device for mixing or homogenizing the melt, the mixing or homogenization device being assigned to the crucible, for example being arranged on and/or in the crucible, so that the mixing or homogenization can take place in the crucible or melting crucible.

It is preferable for batch which is to be melted to be laid onto the melt continuously, approximately in the center and from above, and for liquid melt to be removed from the crucible continuously.

The inventors have established that simply the fact of mixing and/or homogenizing the melt in the melting crucible or skull crucible makes it possible to achieve surprising multiple benefits. Firstly, unmelted batch which drops into the melt in solid form, for example from above, is melted more quickly as a result of more intimate mixing with the liquid fraction of the melt. Surprisingly, the inventors have discovered that the effective contact area between the melt and the supplied material is greatly increased and therefore the melting capacity rises. Secondly, the temperature distribution of the melt is made more even. Thirdly, a uniform distribution of mixing of different glass constituents which, for example, may have different melting points and/or high-frequency coupling coefficients, is achieved. Fourthly, the redox state of the glass can be adjusted.

The action mechanisms which have been discovered are of relevance in particular in conjunction with the inductive high-frequency heating which is preferably used, since the coupling or introduction of the electromagnetic radiation is also dependent on the state of aggregation, the temperature and the particular glass constituent in the melt. In particular, the coupling to unmelted batch constituents is very low.

The apparatus according to the invention and the method are also particularly suitable for high-melting glasses which require melting temperatures of at least 1500° C. or 1600° C. Furthermore, aggressive glasses, e.g. zinc silicate glasses or lanthanum borate glasses, can be melted successfully.

The mixing or homogenization is preferably carried out without any contamination or at least with little contamination, which is highly advantageous in particular for high-purity glasses.

To be mixed or homogenized, it is preferable for the melt to be set in internal motion deliberately or in a predetermined way, or for internal motion to be induced, boosted and/or maintained. In particular, a predefined flow, e.g. with a predefined flow velocity and/or flow direction, is induced in the melt. By way of example, by targeted generation of a temperature difference it is possible to cause a convective flow in the melt, or to induce, assist or boost an existing convective flow.

The mixing or homogenization can be induced or generated with or without material being introduced into the melt.

A preferred form of the material-introducing mixing comprises the introduction of batch which is formed in such a manner that, for example, a flow is induced in the melt simply as a result of the batch being introduced. For this purpose, by way of example, a pelletized and/or coated batch in which in particular gas bubbles are enclosed and/or which releases gas bubbles when it melts is used. It is also possible for the batch to be supplied in pelletized, coated and/or other compacted form without these gas bubbles. In the context of the present invention, the term pelletizing is to be understood as meaning combination to form a stable, solid body, for example by means of pressing. The term coating is to be understood as meaning a structure similar to a solid provided, for example, with a vitreous covering. This, in a particularly advantageous way, both avoids dusting resulting from granular and fine-granular material being supplied and, furthermore, significantly improves the filling rate, since a significantly increased amount of material can be introduced into the melt for the same volumetric flow. Furthermore, batch constituents can be substituted by more fine-grained material without increased dusting occurring, the fine-grained material leading to an optimized melting rate as a result of shortened diffusion paths.

As an alternative or in addition, it is preferable for a batch which has been formed, for example into rods and effects mixing or homogenization in particular by being rotated as it is lowered into the melt, is added. The rods, which are, for example, in the shape of propellers, in particular define an agitator which dissolves of its own accord.

As an alternative or in addition, it is also possible to provide an external agitation device, in particular made from coated metal, for mechanical agitation, or an agitator which is immersed into the melt and dissolves of its own accord, for example by melting, and is made from the same material as the melt.

A particularly preferred embodiment of the invention comprises a device for introducing gas or gas bubbles, for example by means of one or more gas nozzles, into the melt. The gas nozzle is preferably cooled, in particular liquid-cooled, e.g. water-cooled, and is preferably arranged at the base of the crucible. The cooling of the gas nozzle may be connected to the cooling of the crucible or may be formed separately.

According to a particularly preferred embodiment, the gas nozzle projects through the base of the crucible, at least in sections, and extends into the interior of the crucible. In particular, a tip of the gas nozzle extends as far as or into the melt, so that gas which emerges from the gas nozzle or tip rises into the melt in the form of gas bubbles. This bubbling effect intimately mixes and homogenizes the melt in the melting crucible in a particularly simple way.

It is preferable to use $O_2$-containing gas, which has proven highly advantageous in particular for lead silicate glasses. This is because in these glasses the lead is thermally reduced at high melt temperatures, which are used for a high melting capacity. This in turn has an adverse effect on the transmission of the glass, in a similar way to platinum contamination, and may even lead to expensive discoloration, making the melted glass completely unusable. Introduction of oxygen into the melt to prevent the lead from being reduced, so that effective control of the redox state of the glass is achieved by the introduction of gas. This even makes it possible, for example, for lead silicate glass to achieve a melting capacity of approximately 500 kg/day, 800 kg/day, 1000 kg/day or more and, at the same time, to avoid or at least alleviate a significant deterioration in the transmission qualities.

It is preferable for the section of the nozzle which projects into the melt, i.e. for example the tip, to be made from low-contamination material, e.g. a light metal, in particular aluminum, magnesium or beryllium, or at least to be coated with a material of this type. Coating with polytetrafluoroethylene (Teflon®) also appears possible.

In order, after the gas nozzle has "frozen up", i.e. after a solid layer of substance or glass has formed over the gas nozzle, for the gas nozzle to be opened up or cleared again, it is preferable for the gas nozzle to comprise a device for punching through a solid substance or skull layer. This punching device is in particular produced as a needle, e.g. from a material which is able to withstand high temperatures, such as tungsten or similar metal. It is preferable for the needle to be arranged in the center of the gas nozzle, preferably in a longitudinally displaceable manner.

In the text which follows, the invention is explained in more detail on the basis of preferred exemplary embodiments and with reference to the figures, in which identical reference symbols denote identical or similar components.

DETAILED DESCRIPTION OF THE INVENTION

Figure 1:
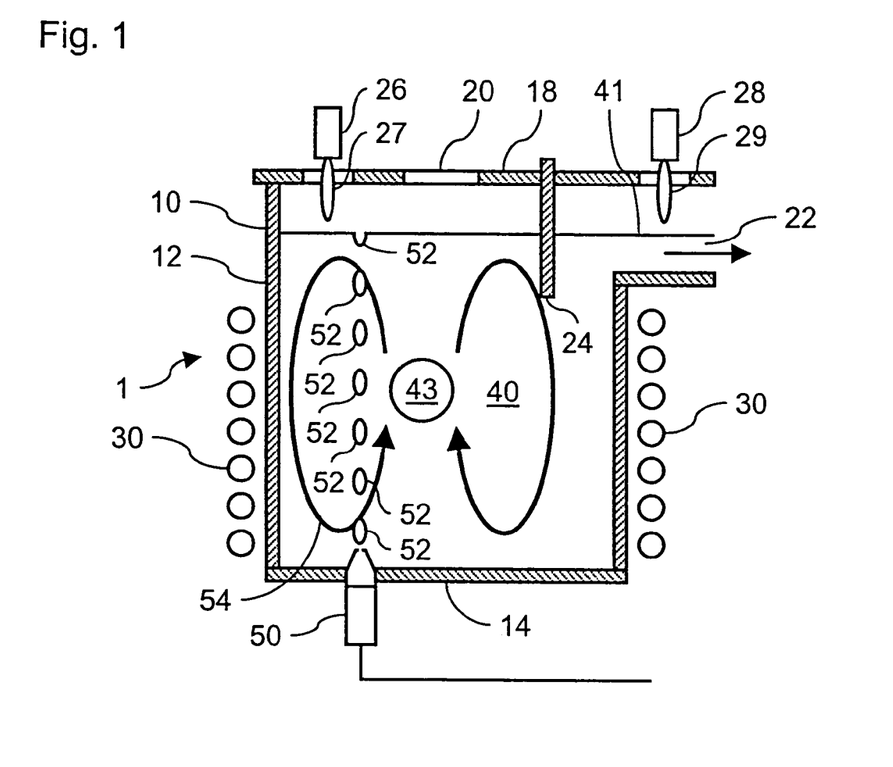
FIG. 1 shows a diagrammatic sectional illustration of a first embodiment of the apparatus according to the invention with a gas nozzle.

FIG. 1 shows a first embodiment of the apparatus 1 according to the invention for melting glass, having a cooled, e.g. water-cooled, crucible or melting crucible 10. An emitting device for emitting electromagnetic radiation, in the form of a coil arrangement 30, is arranged around the crucible 10. High-frequency power is introduced into a melt 40, for example comprising lead silicate glass, by means of the coil arrangement, so that the melt 40 is heated. A high frequency of approximately 250 kHz to approximately 400 kHz at an emission power of approximately 200 kW to approximately 300 kW or higher is used. The temperature of the melt is in the range from 1200° C. to 2000° C.

The crucible 10 comprises a water-cooled annular wall section 12 and a water-cooled base 14. The wall section 12 and the base 14 together form the cooled wall of the crucible 10 and each comprise metal tubes 16 which are arranged in meandering form and are spaced apart from one another, as can be seen most clearly from FIGS. 2 and 3. The metal tubes 16 have a cross section of approximately 2 cm and gaps of 5 mm between the tubes 16, so that the crucible wall is initially permeable to liquid when the crucible 10 is unfilled.

On account of the cooling of the wall section 12 and of the base 14, i.e. the crucible wall, a solid, continuous skull layer 42 of material of the same composition as the melt, i.e. in this exemplary embodiment of glass, is formed in the contact region between the melt 40 and the crucible wall, so that the arrangement formed from the crucible 10 and the solid skull layer 42 becomes liquid-tight. FIG. 1, which represents a diagrammatic illustration of the crucible, does not show the individual tubes 16 and the skull layer 42.

Continuing to refer to FIG. 1, it should be noted that the melting apparatus is operated continuously, so that batch is regularly laid onto the melt through a substantially central opening 20 in a cover 18 of the crucible 10. Furthermore, melt is continuously removed via an outlet opening 22 of the crucible 10.

A cooled bridge 24 penetrates into the melt 40 to a depth of at least approximately 3 cm to 5 cm in the vicinity of the outlet opening 22, in order to keep unmelted or undissolved constituents of the batch away from the outlet opening 22.

Furthermore the apparatus 1 comprises two burners 26, 28 which direct flames 27, 29 onto the contents of the crucible or a surface 41 of the melt 40 through openings in the cover 18. In this arrangement, the burner 26 is used for initial melting of the contents of the crucible when the apparatus 1 is starting up, for example after a change of crucible, and the burner 28 is used to continuously reheat the melt 40 in the outlet opening 22.

A mixing or homogenization device in the form of a gas nozzle 50 is arranged at the base 14 of the crucible 10. The gas nozzle 50 projects into the crucible in sections and introduces the gas into the melt 40.

Furthermore, the gas nozzle 50 is arranged eccentrically, in this exemplary embodiment approximately halfway between the center and the edge of the round crucible 10 and on the opposite side from the outlet opening 22. This position has proven highly advantageous since a convective flow 54, which is in any case present as a result of a temperature difference in the melt and rises centrally from a hot core 43 and then descends at the edge, is boosted and, at the same time, batch which is laid centrally through the opening 20 is kept away from the cold crucible wall 12 by means of the gas bubbles 52. The substantially annular flow 54 advantageously results in effective mixing and homogenization of the melt and is responsible for a temperature compensation and a uniform distribution of the material in the melt.

In this example, the gas bubbles contain $O_2$ in order at the same time to oxidize lead in the lead silicate glass melt 40.

Figure 2:
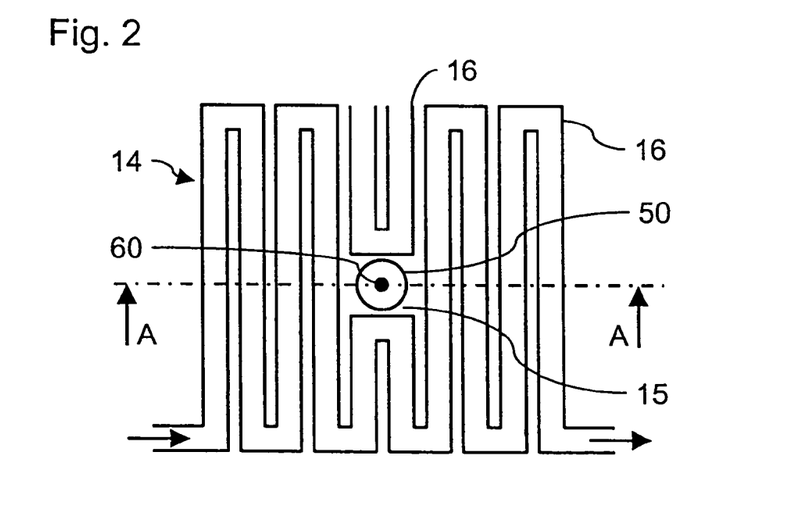
FIG. 2 shows a diagrammatic plan view from above of part of the crucible base in accordance with the first embodiment of the invention.

FIG. 2 shows a diagrammatic plan view from above of the crucible base 14 with the gas nozzle 50, which is arranged in an opening 15 or cutout in the crucible base 14 between the meandering metal tubes 16.

Figure 3:
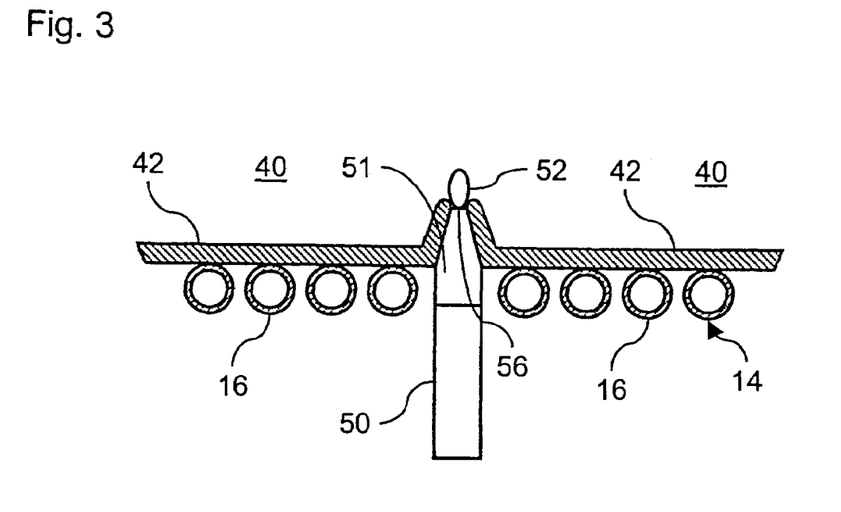
FIG. 3 shows a diagrammatic sectional illustration of part of the crucible base on section line A-A in FIG. 2.

As is also illustrated in FIG. 3, the skull layer 42 is formed not only on the cooled base 14 of the crucible, but also on the cooled gas nozzle 50. However, the escaping gas bubbles 52 ensure that an opening of the gas nozzle is kept clear for prolonged periods.

Figure 4:
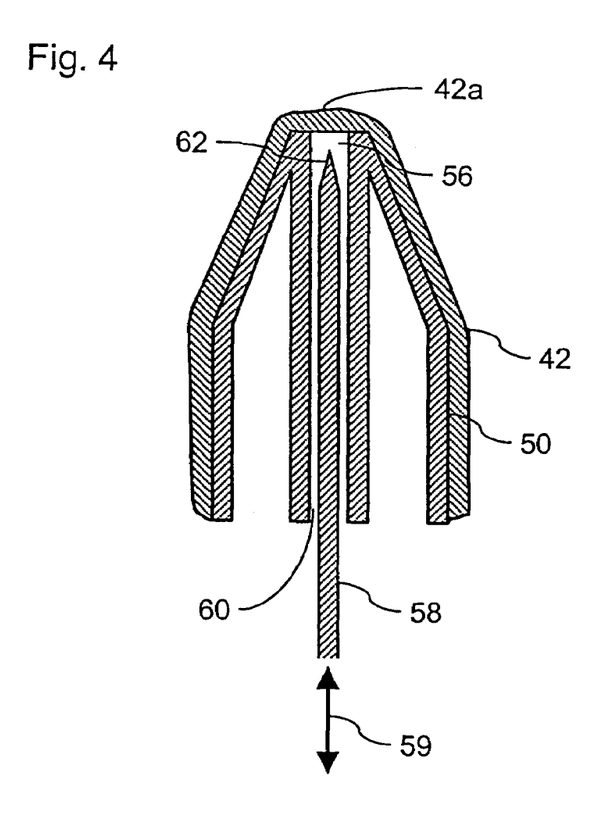
FIG. 4 shows a diagrammatic sectional illustration of an upper part of the gas nozzle in accordance with the first embodiment of the invention.

Nevertheless, the solid skull layer 42 may close up over an outlet opening 56 of the gas nozzle 50, so that it is no longer possible for gas to escape from the nozzle 50, for example as a result of an interruption in the gas feed. This situation is illustrated in FIG. 4. To allow the opening 56 to be opened up again, the gas nozzle comprises a needle 58 which is arranged longitudinally displaceably, in the direction indicated by the arrow 59, inside a passage 60 in the center of the gas nozzle. Therefore, a tip 62 of the needle 58 can punch through a section 42a of the skull layer 42 which is above the gas outlet opening 56, so that the gas outlet opening 56 can be opened up again.

The inventors have discovered that an upper section 51 of the gas nozzle 50, which projects into the crucible 10 and at least in part is in direct contact with the skull layer 42, is preferably made from non-contaminating or at least low-contamination material. In the context of the present invention, the term low-contamination is to be considered to encompass materials which substantially have little or no effect on the glass quality. These are in particular light metals, such as for example aluminum. Although aluminum does pass into the melt, aluminum ions or aluminum compounds substantially have little or no adverse effect on the optical properties, in particular the transmission of the glass. On the other hand, cooling of the gas nozzle 50 ensures that the gas nozzle 50 is able to withstand the high temperatures in the crucible 10.

Furthermore, the use of a metal with a high melting point, e.g. higher than 2000° C., in particular molybdenum, iridium, tungsten or a tungsten compound, has proven advantageous to the needle 58.

Figure 5:
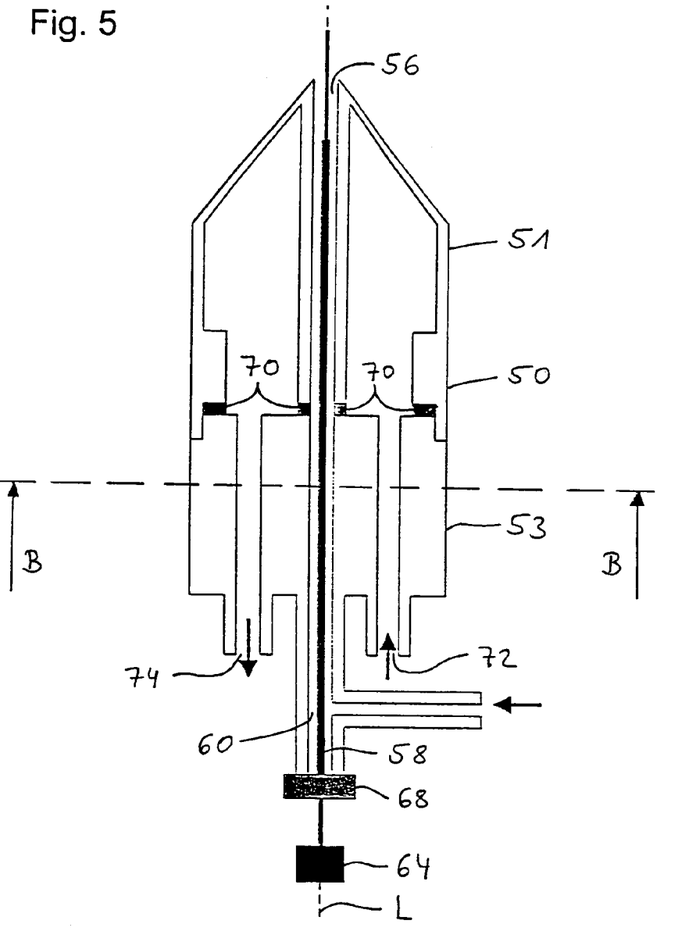
FIG. 5 shows a longitudinal section through the gas nozzle in accordance with the first embodiment of the invention.

FIG. 5 shows the gas nozzle 50 in longitudinal section. The gas nozzle 50 comprises the gas outlet opening 56 and the gas passage 60 in which the needle 58 runs and is guided. The needle 58 can be displaced inside the gas nozzle 50, parallel to the passage 60, by means of a displacement device 64. Furthermore, the gas nozzle 50 comprises a gas inlet 66 and a seal 68 for the needle 58. The upper section 51 of the gas nozzle 50 comprises aluminum or an aluminum-containing alloy, with a lower section 53 of the gas nozzle 50 made from brass. The upper and lower sections 51, 53 are sealed in a fluid-tight manner with respect to one another by seals 70. In the lower section 53 there is a cooling water inlet 72 and a cooling water outlet 74, so that the gas nozzle can be effectively cooled by water flowing through it.

Figure 6:
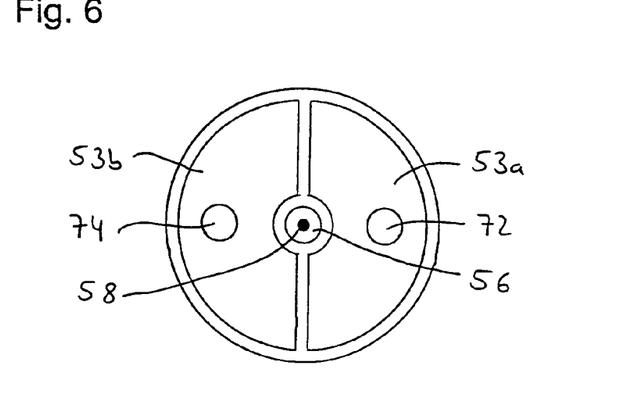
FIG. 6 shows a cross section through the gas nozzle on section line B-B in FIG. 5.

Referring to FIG. 6, which illustrates a cross section through the nozzle, it can be seen that the lower section 53 is divided, parallel to a longitudinal axis L of the gas nozzle 50, into two halves 53a, 53b, which are electrically insulated from one another.

Figure 7:
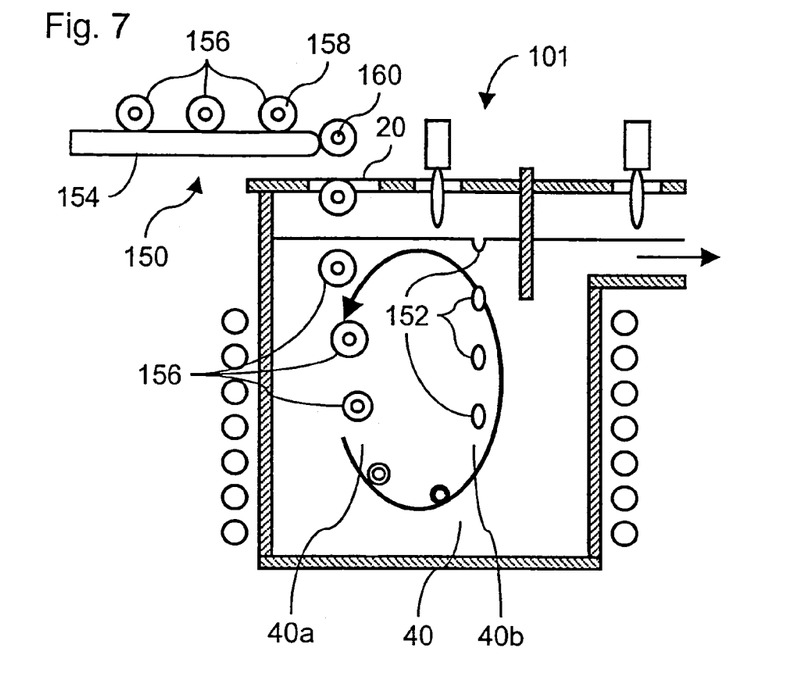
FIG. 7 shows a diagrammatic sectional illustration of a second embodiment of the invention.

FIG. 7 shows a second embodiment of the apparatus 101 according to the invention, with an alternative device 150 for mixing and homogenizing the melt 40. Glass batch which has been formed into pellets, coated pills and/or beads 156 is introduced, via a conveyor belt 154, into the melt 40 through the opening 20. The glass beads 156 comprise an outer boundary region 158 and an inner core region 160. The boundary region 158 substantially comprises glass of the same composition as the melt 40. The core region 160 comprises a substance which releases a gas or gas bubbles 152 in the melt when the boundary region 158 has melted. The substance in the core region 160 may comprise a gas, a liquid, e.g. water, or a solid material, e.g. a salt, which by interacting with the hot melt 40 release the gas bubbles 152.

The fact that the glass beads 156 sink in a left-hand section 40a of the melt and the fact that the gas bubbles 152 rise up in a right-hand section 40b of the melt 40 result in a substantially annular flow being generated or induced within the melt 40. However, it is also possible, as shown in FIG. 1, for an existing convective flow to be boosted.

Figure 8:
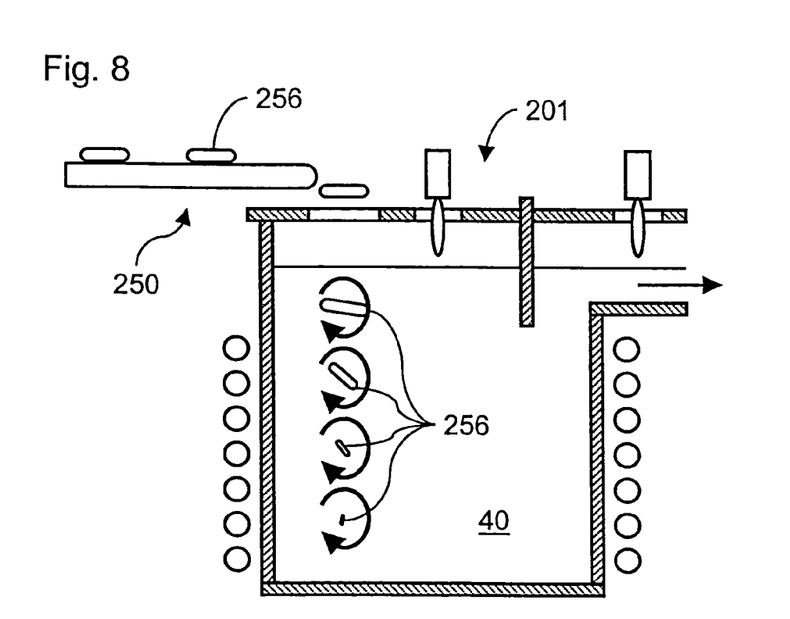
FIG. 8 shows a diagrammatic sectional illustration of a third embodiment of the invention.

FIG. 8 shows a third embodiment of the apparatus 201 according to the invention, in which batch bodies 256 which have been pressed into the form of rods are introduced into the melt 40 by means of a mixing and homogenization device 250. The bodies 256 in rod form are, for example, shaped in the style of propellers and rotate as they sink within the melt 40, with the bodies 256 being melted at the same time, so as to generate flow phenomena in the melt 40.

Figure 9:
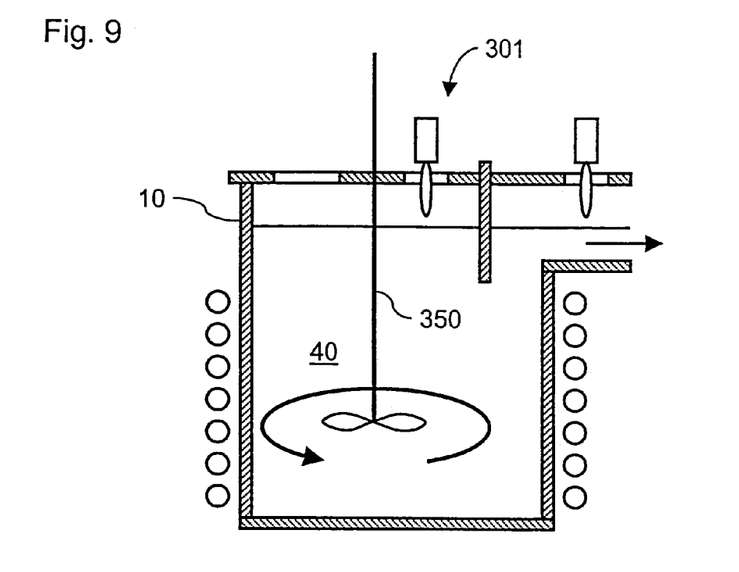
FIG. 9 shows a diagrammatic sectional illustration of a fourth embodiment of the invention.

FIG. 9 shows a fourth embodiment of the apparatus 301 according to the invention with an agitator 350 which mechanically makes the melt 40 in the melting crucible 10 flow by means of a rotational movement.

Figure 10:
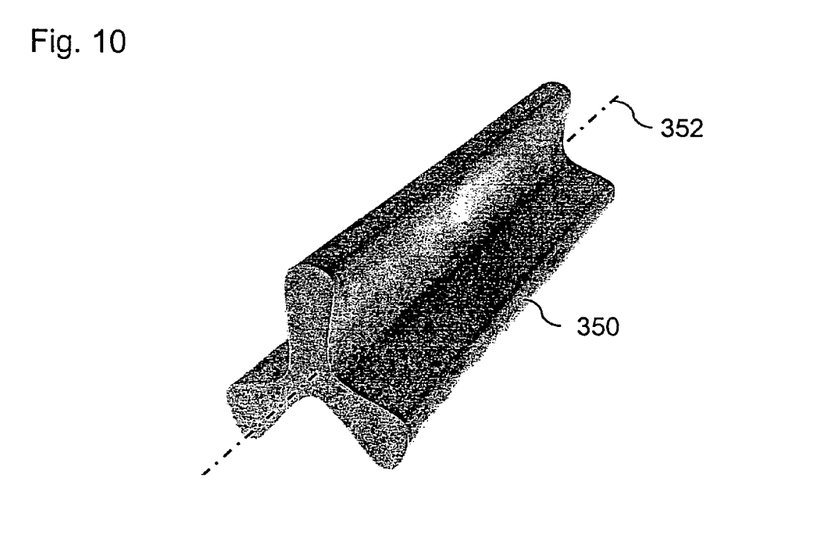
FIG. 10 shows a diagrammatic, perspective illustration of an agitator which dissolves of its own accord, in accordance with a fifth embodiment of the invention.

FIG. 10 shows a preferred embodiment of an elongate agitator 350'. The agitator 350' is substantially produced, e.g. by pressing, from the glass which also forms the melt 40. The agitator 350' is introduced into the melt 40 from above along its longitudinal axis 352, for example in a similar manner to the agitator 350 shown in FIG. 9, and is rotated about its axis 352. The agitator 350' comprises three agitating arms which extend away from the center and is dissolved of its own accord by melting in the melt 40. To ensure continuous addition of glass and agitation, the agitator 350' is correspondingly continuously moved in further from above.

Figure 11:
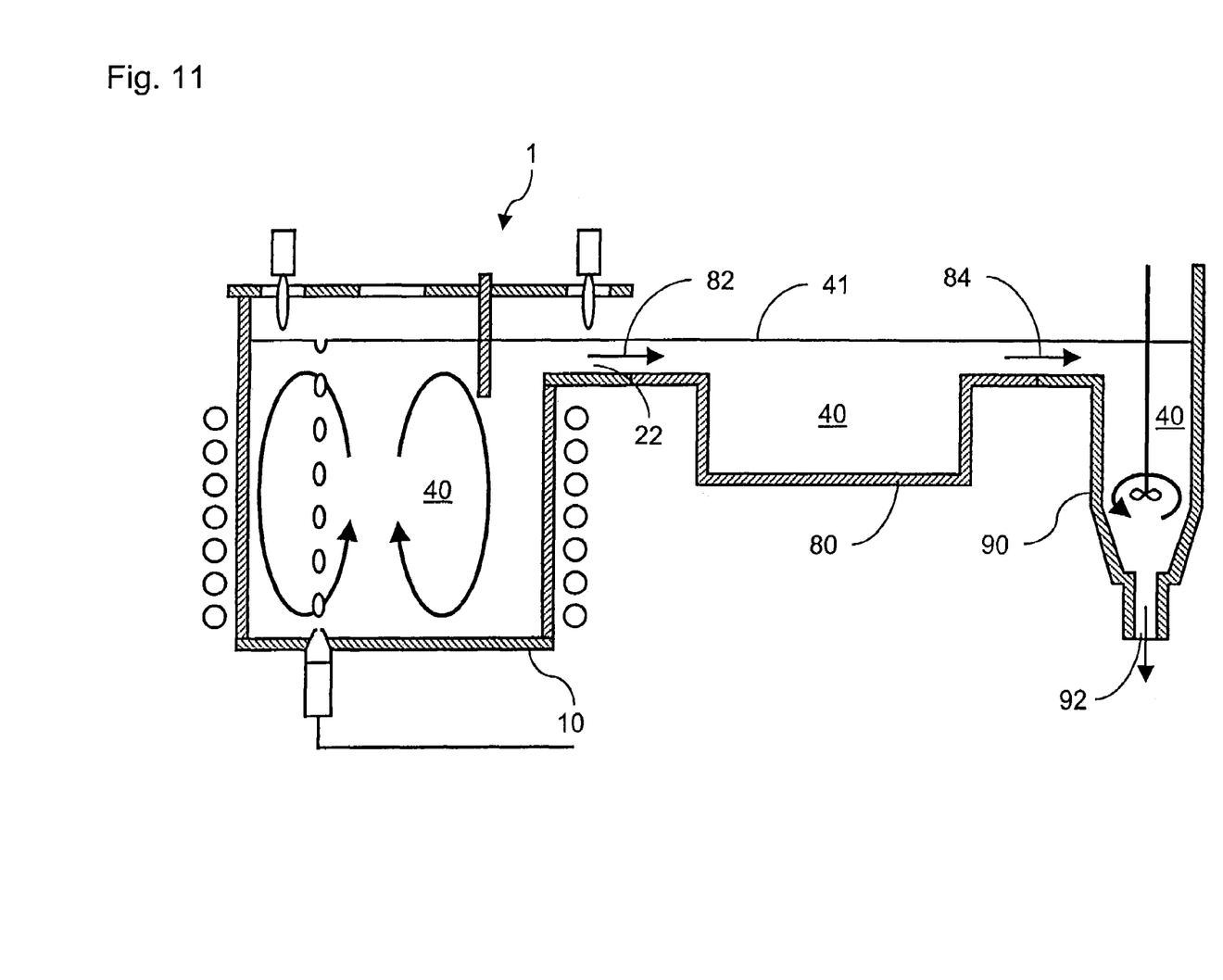
FIG. 11 shows a diagrammatic sectional illustration of the first embodiment of the invention, having a refining channel and a homogenization tank furnace.

FIG. 11 shows the first embodiment of the apparatus 1 according to the invention with a connected refining channel 80 and an additional external homogenization device 90. Liquid glass is continuously passed out of the crucible 10, in the direction indicated by arrow 82, into the refining channel 80 and, from there, in the direction indicated by arrow 84, onwards into the external homogenization device 90. The external homogenization device 90 comprises a glass outlet 92 for pouring, e.g. into a mold and/or for further or final processing of the glass to form a glass product or glass-ceramic product.

Refining of the glass in the refining channel 80 and subsequent homogenization in the external homogenization device 90 further improves the quality of the glass. The glass quality achieved with the apparatus according to the invention may, however, already be sufficiently high, so that there is no need for the refining channel 80 and/or the homogenization device, with the result that the glass melt 40 is ready for further or final processing at the outlet opening 22.

It will be clear to the person skilled in the art that the invention is not restricted to the exemplary embodiments described above and can be varied in numerous ways without departing from the spirit of the invention.

The invention claimed is:

1. An apparatus for melting glass or glass-ceramic, comprising:
   a crucible;
   an emitting device for emitting electromagnetic radiation into a melt in the crucible so that the melt is heated by the electromagnetic radiation; and
   a mixing device being assigned to the crucible so that the melt can be mixed and/or homogenized while it is still in the crucible, wherein the mixing device introduces a predefined flow in the melt.

2. The apparatus as claimed in claim 1, wherein the melt is set in internal motion by the mixing device.

3. The apparatus as claimed in claim 1, wherein the crucible comprises an outflow opening for the melt and a cooled bridge, the cooled bridge being immersed in the melt so that unmelted batch fractions are kept away from the outflow opening by the cooled bridge.

4. The apparatus as claimed in claim 1, further comprising an agitating device that is arranged in the crucible.

5. The apparatus as claimed in claim 1, further comprising a device for introducing gas or gas bubbles into the melt.

6. The apparatus as claimed in claim 1, further comprising one or more gas nozzles.

7. The apparatus as claimed in claim 6, wherein the one or more gas nozzles comprise one or more liquid-cooled nozzles.

8. The apparatus as claimed in claim 6, wherein the one or more gas nozzles are arranged at a base of the crucible.

9. The apparatus as claimed in claim 6, wherein each of the one or more gas nozzles comprise at least a first section that projects into the crucible.

10. An apparatus for melting glass or glass-ceramic, comprising:
a crucible;
an emitting device for emitting electromagnetic radiation into a melt in the crucible so that the melt is heated by the electromagnetic radiation; and
a mixing device being assigned to the crucible so that the melt can be mixed and/or homogenized while it is still in the crucible, wherein the mixing device introduces a first material to the melt to induce a substantially predefined motion in the melt.

11. An apparatus for melting glass or glass-ceramic, comprising:
a crucible;
an emitting device for emitting electromagnetic radiation into a melt in the crucible so that the melt is heated by the electromagnetic radiation;
a mixing device being assigned to the crucible so that the melt can be mixed and/or homogenized while it is still in the crucible; and
an agitator dissolved or melted in the melt.

12. An apparatus for melting glass or glass-ceramic, comprising:
a crucible;
an emitting device for emitting electromagnetic radiation into a melt in the crucible so that the melt is heated by the electromagnetic radiation;
a mixing device being assigned to the crucible so that the melt can be mixed and/or homogenized while it is still in the crucible;
one or more gas nozzles; and
a device for punching through a solid skull layer on a base of the crucible.

13. The apparatus as claimed in claim 12, wherein said device comprises a needle, and wherein the needle comprises a material selected from the group consisting of tungsten, molybdenum, iridium, and any combinations thereof.

14. The apparatus as claimed in claim 13, wherein the needle is arranged substantially in a center of the one or more gas nozzles.

15. A method for melting a glass or glass-ceramic in a melting crucible, the method comprising:
emitting electromagnetic radiation into the melting crucible to form a melt of the glass or glass-ceramic; and
mixing or homogenizing the melt, wherein mixing or homogenizing the melt introduces a flow in the melt in predetermined form.

16. The method as claimed in claim 15, wherein the melt is deliberately set in internal motion in order to be mixed or homogenized.

17. The method as claimed in claim 15, further comprising keeping unmelted batch fractions away from a crucible outflow opening by means of a cooled bridge.

18. The method as claimed in claim 15, further comprising introducing a batch into the melt so that the introduction of the batch effects the mixing or homogenization of the melt.

19. The method as claimed in claim 18, wherein the batch is a pelletized and/or coated batch.

20. The method as claimed in claim 18, wherein the batch releases a gas or gas bubbles into the melt.

21. The method as claimed in claim 15, wherein the melt is agitated in order to be mixed or homogenized.

22. The method as claimed in claim 15, further comprising introducing a gas or gas bubbles into the melt for mixing or homogenization purposes.

23. A method for melting a glass or glass-ceramic in a melting crucible, the method comprising:
emitting electromagnetic radiation into the melting crucible to form a melt of the glass or glass-ceramic;
mixing or homogenizing the melt; and
introducing a first material into the melt so that a substantially predefined flow motion is induced in the melt.

24. A method for melting a glass or glass-ceramic in a melting crucible, the method comprising:
emitting electromagnetic radiation into the melting crucible to form a melt of the glass or glass-ceramic;
mixing or homogenizing the melt; and
introducing an agitator into the melt, the agitator dissolving when introduced into the melt.

* * * * *